United States Patent [19]

Thibault et al.

[11] Patent Number: 4,523,376
[45] Date of Patent: Jun. 18, 1985

[54] METHOD FOR SEALING A RECHARGABLE CELL

[75] Inventors: William C. Thibault, Melrose; Paul E. Pate, Branford, both of Fla.

[73] Assignee: General Electric Company, Gainesville, Fla.

[21] Appl. No.: 505,159

[22] Filed: Jun. 17, 1983

[51] Int. Cl.³ .............................................. H01M 6/00
[52] U.S. Cl. ................................. 29/623.2; 429/174; 429/184
[58] Field of Search ............... 29/623.2; 429/174, 184, 429/94

[56] References Cited

U.S. PATENT DOCUMENTS

| | | | |
|---|---|---|---|
| 3,062,910 | 11/1962 | Schenk, Jr. | 136/133 |
| 3,185,595 | 5/1965 | Schenk, Jr. | 136/133 |
| 3,262,819 | 7/1966 | Belove | 136/178 |
| 4,063,902 | 12/1977 | Heinz, Jr. | 29/623.2 |
| 4,110,518 | 8/1978 | Gilmour et al. | 429/174 |
| 4,332,867 | 6/1982 | Tsuda et al. | 429/94 |
| 4,345,611 | 8/1982 | Ikeda et al. | 137/68 R |
| 4,437,231 | 3/1984 | Zupanin | 29/623.2 |

Primary Examiner—Charles F. Lefevour
Attorney, Agent, or Firm—Henry J. Policinski

[57] ABSTRACT

An electrochemical cell and method of making same are provided wherein the electrochemical cell includes a radial sealing function effected by the combination of a seal comprised of an amorphous polymer and a cell container wall having a stiffening rib on one axial side of the seal and a lip on the other side of the seal wherein the rib and the lip eliminate springback of the container wall upon removal of the external radial force establishing the compressive sealing forces.

4 Claims, 6 Drawing Figures

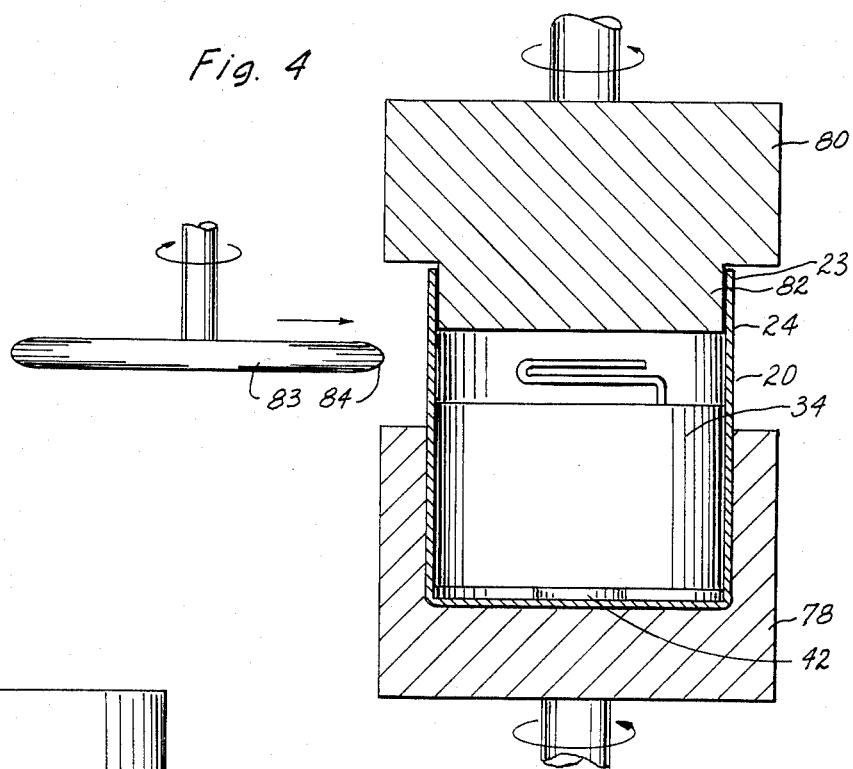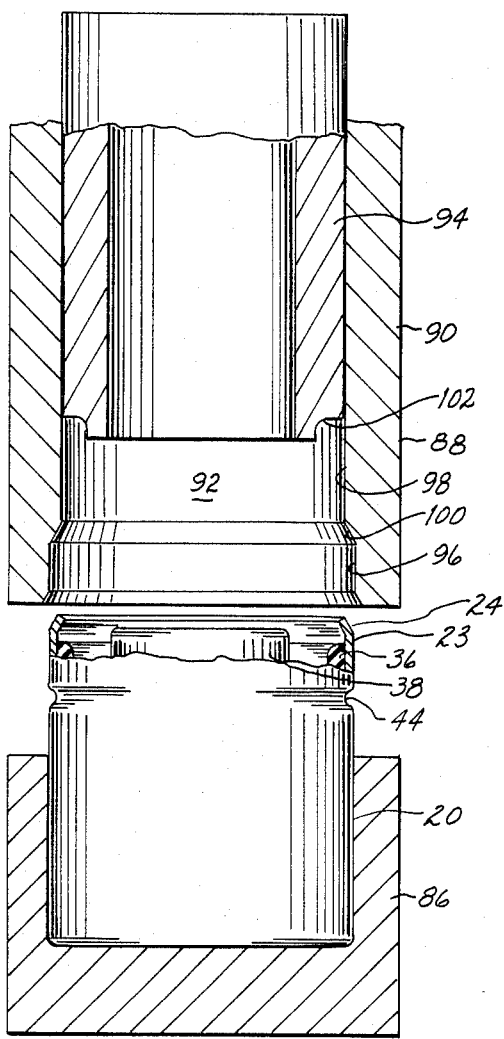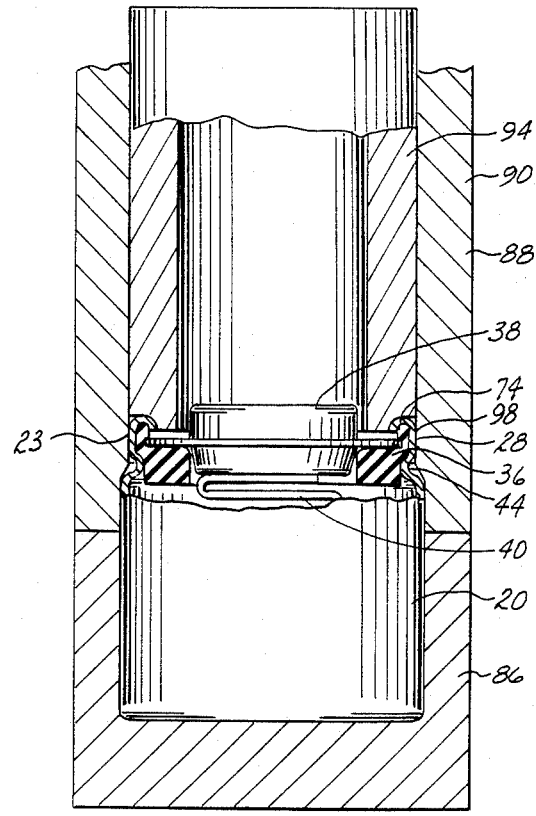

METHOD FOR SEALING A RECHARGABLE CELL

BACKGROUND OF THE INVENTION

This invention relates to a rechargeable electrochemical cell and more particularly to an improved high compression radial seal for retaining electrolyte within the confines of a rechargeable electrochemical cell.

Many state of the art rechargeable electrochemical cells, such as nickel-cadmium cells, are comprised of at least two opposite polarity electrode plates loaded with an electrochemically active material. The electrodes are separated by a strip of separator and the assembly is spirally wound into a cylindrical container or can. Electrolyte is introduced into the can and is retained in the pores of the electrodes and the separator. The cell includes a cover which cooperates with the container to provide a sealed environment within the cell wherein the various electrochemical reactions may occur during operation of the cell. It is necessary to introduce an insulating material between the cover and the container wall which also acts as the sealing material to prevent leakage of electrolyte from the cell at the interface between the cover and the container.

It is important that the seal associated with the above-described electrochemical cell maintain an effective sealing function throughout the life of the cell. If the sealing function is not maintained, a number of undesireable conditions adverse to effective cell operation may result. First, water from the electrolyte can be lost from the cell through evaporation or means causing the cell to no longer function as an effective means of storing and delivering electrical energy. Secondly, electrolyte leaking from the cell may, due to its corrosive nature, contaminate and damage exterior components of the cell or, more importantly, elements of the device in which the cell is installed.

Radial seal mechanisms heretofore known and used to prevent leakage of electrolyte from electrochemical cells have proved not entirely suitable for that purpose. More specifically, the material used in the seal itself has usually been comprised of a crystalline polymer such as nylon. These crystalline polymer materials may be deformed or compressed only up to about 20% to 25% of their free radial thickness without suffering a reduction in sealing capability. Furthermore, over this range of deformation the maximum compressive stress attainable before failure of the material has not proved to be sufficient to provide effective sealing for a sustained period over the life of the electrochemical cell.

Deformability and high compressive stress capability are both important characteristics in a radial seal material. The material must be capable of withstanding the high radial compressive forces necessary to achieve a seal impervious to the passage of electrolyte. It has been discovered that the leakage of electrolyte, such as potassium hydroxide associated with a nickel-cadmium electrochemical cell, past a radial seal may only be eliminated by seals under high radial compressive force heretofore unapplied in radial seals in the prior art.

Furthermore, the material must have the capability to withstand high compressive stress in order to accommodate high radial compressive forces which may occasionally result when various cell component parts are manufactured to dimensions at the outer limits of the normal tolerance associated with the component parts. The material also must be capable of substantial radial deformation or compression from its free radial thickness in order to be compatible with the aforementioned tolerance "stack-up" encountered with the manufacture of electrochemical cells in large quantities and at high rates.

As is well known, the individual component parts of an electrochemical cell, as with many products, each have tolerances associated with critical dimensions or specifications of the parts. The smaller the tolerances the greater the cost of the component and the greater the cost and selling price of the cell. It has been found that with tolerances necessary to produce the cell at a competitive cost for sale at a competitive price, a cell exiting a production line may be assembled with parts which have dimensions at the outer limits of the tolerance band. More specifically, with the parts intended to provide the radial seal, the actual dimensions of the parts may be such that the gap in which the seal resides may be at a maximum while the amount of seal material may be at a minimum. Accordingly, the amount of compression of the seal member will be less than intended. Cells so made may exhibit little or in some cases no sealing integrity. As a remedy to this problem, the component part may be redimensioned so that the amount of seal material present under minimal tolerances is increased. This remedy, however, can only be appropriate where the material exhibits a proper stress/strain relationship. Otherwise the material will be overstressed when the tolerance stack up is reversed; that is to say, the gap is at a minimum and the amount of seal material is at a maximum. An appropriate stress/strain relationship would be found in a material capable of high compressive stress over a substantial range of deformation.

In order to achieve the high radial sealing forces necessary to effect a seal of high integrity and in order to be compatible with tolerance stack up, the radial seal material should be capable of undertaking a radial compressive stress of up to about 40,000 psi and a radial deformation or compression from its free height of up to 50%. Prior art crystalline polymer materials such as nylon are not capable either of this radial compressive stress or this radial deformation or compression without compromise of sealing integrity. The invention disclosed hereinafter overcomes this shortcoming of prior art crystalline polymer materials.

In addition to the seal itself, other cell component parts cooperate in the sealing function of a radial seal of an electrochemical cell; namely, the container and the cover assembly. As higher compressive sealing forces are introduced in the high volume manufacture of electrochemical cells having radial seals, the tendency of the container to spring back is increased. More specifically, a radial seal function is achieved by deforming the cell container wall radially inwardly past its elastic limit to thereby compress the radial seal material between the container wall and the seal cover assembly. When the deforming force is removed from the container wall, the wall has a tendancy to move radially outward or sping back in response to the compressive force present in the seal material. The more the wall is deformed the higher the compressive force generated in the seal and the greater the springback of the container wall after removal of the deforming force. One prior art approach in limiting the amount of springback of the container wall is disclosed in U.S. Pat. Nos. 3,062,910 and 3,185,595. These patents teach springback reduction by providing a metal reinforcing ring at one end of the cell container adjacent that part of the wall to which the deforming force is applied. The metal reinforcing ring is deformed along with the container wall and the reduction in springback is accomplished due to the increase in radial cross-section of deformed material added by the presence of the reinforcing ring. However, this approach is disadvantageous at least because of the added cost of fabrication, material and handling associated with the additional separate component part in the form of a reinforcing ring. In addition, the use of a reinforcing ring may not provide sufficient retaining force to prevent the cell top from bursting at high internal pressures, generally above 1,200 psi. The invention hereinafter disclosed addresses these shortcomings associated with a reinforcing ring.

While some prior art electrochemical cells have utilized amorphous polymers such as polysulfone in radial seals along with reinforcing rings, such cells also suffer from the aforementioned disadvantages associated with reinforcing rings. While other prior art electrochemical cells have also employed amorphous polymers as seals in axial seals these cells suffer from the disadvantages usually associated with axial seal structures; namely, low and erratic sealing forces under high volume production conditions and excessive springback. Accordingly then, the prior art does not admit of a radial seal employing an amorphous polymer in combination with other sealing structures whereby a sealing function of high integrity is produced capable of withstanding high deformation and effecting high compressive sealing forces and capable of also preventing cell top bursting at high internal pressures.

Therefore, it is an object of the present invention to provide a new improved electrochemical cell configuration having a radial seal of high sealing integrity.

It is another object of the present invention to provide a radial seal capable of withstanding high radial compressive forces.

It is still another object of the present invention to provide a radial seal capable of withstanding a high degree of deformation without any compromise of sealing integrity.

It is yet another object of the present invention to provide a radial seal which is compatible with tolerance limits normally associated with component parts of an electrochemical cell.

It is still another object of the present invention to provide a radial seal for an electrochemical cell in which the springback of the cell container wall is reduced or eliminated and in which the cell has a high capability to withstand high burst pressures.

It is yet another object of the present invention to provide a method of making an electrochemical cell having a radial seal of high integrity.

SUMMARY OF INVENTION

Briefly stated, these and other objects, as well as advantages, which will become apparent hereinafter, are accomplished by the present invention which, in one form, provides an electrochemical cell comprised of a cylindrial container having a cylindrical wall portion and a bottom portion integrally formed with said wall portion. A radially inwardly sealing surface is disposed on the cylindrical wall portion. The cell further comprises an electrode assembly having a pair of electrode plates separated from each other by an electrolyte absorbant material all spirally wound and inserted into the container. A stiffening rib is formed in the container wall and cooperates with a radially projecting lip at one end of the container to substantially reduce springback of the container wall. An annular seal member comprised of an amorphous polymer is disposed between the sealing surface on the container wall and an edge face disposed on a cover assembly. The cover assembly and wall portion exert a radial compressive force on the seal member whereby the seal member is disposed in a state of radial compression. The method for making the cell comprising this invention includes the step of deforming the end of the container wall radially inward contemporaneously with the step of applying a radially inwardly directed force to the container wall adjacent the sealing surface thereon.

DESCRIPTION OF THE DRAWINGS

While the specification concludes with claims distinctly claiming and particularly pointing out the invention described herein, the invention is more readily understood by reference to the description hereinafter set forth and the accompanying drawings in which:

FIG. 4 depicts a schematic view showing a step in the manufacture of an electrochemical cell embodying the present invention.

FIG. 5 depicts a schematic view showing and the step in the manufacture of an electrochemical cell embodying the present invention.

FIG. 6 depicts a schematic view showing another step in the manufacture of an electrochemical cell embodying the present invention.

DESCRIPTION OF THE PREFERRED EMBODIMENT

Figure 1:
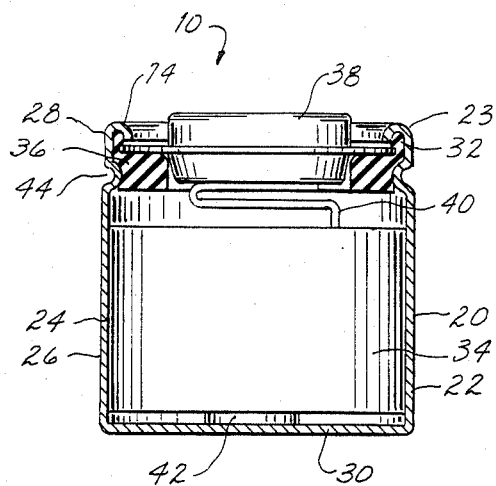
FIG. 1 depicts a partial cross-sectional view of the electrochemical cell embodying the present invention.
Figure 2:
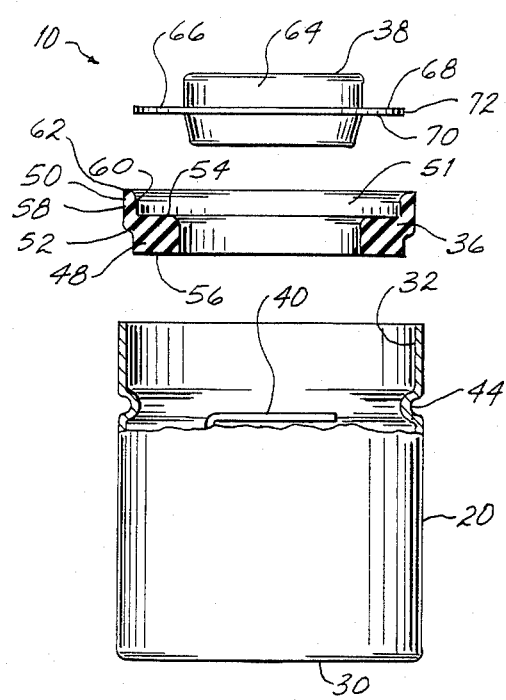
FIG. 2 depicts an exploded view of the electrochemical cell embodying the present invention.

Referring now to FIGS. 1 and 2, there is depicted an electrochemical cell, shown generally at 10, constructed in accordance with the present invention. FIG. 1 depicts the fully assembled cell entirely in cross-section except for the electrode assembly, conductor tab and cover assembly each of which are shown in plane view. FIG. 2 depicts an exploded view of the cell prior to the application of radial force and shows the seal member and cover assembly removed from the can.

Cell 10 is comprised of a cylindrical container 20 having first and seconds end 22 and 23. Container 20 includes a circumferentially and axially extending cylindrical wall portion 24 having a first enlarged diameter segment and a second diameter reduced segment 28 having a diameter less than the diameter of segment 26. Wall portion 24 is integrally joined to a bottom portion 30 closing end 22 of container 20. Circumferentially extending radially inwardly facing sealing surface 32 is disposed on reduced diameter segment 28 of wall portion 24.

Cell 10 is further comprised of electrode assembly 34 having a pair of opposite polarity electrode plates separated from each other by an electrolyte absorbant separator material all spirally wound together and inserted into container 20 axially adjacent to bottom portion 30. Also comprising cell 10 are seal member 36, cover assembly 38 and conductive tabs 40 and 42. One of the electrode plates of electrode assembly 34 is electrically connected by conductive tab 42 to bottom portion 30 of container 20 to form one of the terminals of cell 10. The other electrode plate of electrode assembly 34 is electrically connected to cover assembly 38 by conductive tab 40 whereby cover assembly 38 forms the other terminal of cell 10. Seal member 36 in addition to preventing the leakage of electrolyte from the container 20 insulates cover assembly 38 from container 20.

A radially inwardly projecting circumferentially extending stiffening rib 44 is formed integrally with wall portion 20 axially adjacent the electrode assembly 34 so that electrode assembly 34 is disposed between rib 44 and bottom portion 30 of container 20. As will hereinafter be explained stiffening rib 44 cooperates with other container elements to reduce springback of container wall portion 24.

Resilient annular seal member 36 is comprised of a generally annular or ring-like base portion 48, generally rectangular in cross-section, to which annular or ring-like sealing projection 50 is integrally joined by chamfered surface 52. Base portion 48 includes a pair of oppositely axially facing end surfaces 54 and 56. Sealing projection 50, which circumscribes recess 51 bounded in part by end surface 54, projects axially from the radially outer edge of base portion 48 and is provided with a first circumferentially and axially extending radially outwardly facing sealing surface 58 and a second circumferentially and axially extending radially inwardly facing sealing surface 60 disposed radially inwardly from and in the same radial plane with sealing surface 58. Additionally, sealing surfaces 58 and 60 are co-axial. Finally, sealing projection 50 terminates in an axially facing end face 62 connecting sealing surfaces 58 and 60.

Seal member 36 resides in end 23 of container 20 and is disposed such that chamfered surface 52 is in abutting engagement with stiffening rib 44 which serves to locate seal member 36 during assembly into container 20. Additionally, seal member 36 is disposed in container 20 such that radially outwardly facing sealing surface 58 on seal 36 is in sealing engagement with radially inwardly facing sealing surface 32 on reduced diameter segment 28 of wall portion 24.

Cover assembly 38 is comprised of a generally cylindrical housing 64 from which circumferentially extending annular flange 66 projects radially outwardly about the circumference of housing 64. Flange 66 includes a pair of opposed axially facing surfaces 68 and 70 each terminating at their most radially outward extent in axially and circumferentially extending radially outwardly facing edge face 72. Cover assembly 38 resides in recess 51 of seal member 36 with axially facing surface 70 in abutting engagement with end surface 54 of base portion 48 of seal 36. Edge face 72 is disposed radially inwardly of, radially adjacent to, and in sealing engagement with radially inwardly facing sealing surface 60 of seal member 36.

Reduced diameter segment 28 of wall portion 24 terminates in radially inwardly projecting lip 74 formed therein. Lip 74 in addition to projecting radially inwardly also projects axially toward cover member 38. By virtue of its radial projection lip 74 serves to stiffen end 23 of container 20 and by virtue of its axial projection serves to form a secondary sealing interface with end face 62 of seal member 36. Cooperating together, lip 74 and stiffening rib 44 provide end 23 of container 20 with additional structural integrity to resist deformation or movement due to springback of wall portion 24. More specifically, the lip 74 and rib 44 straddle seal member 36 and hence are disposed immediately axially adjacent seal member 36. Accordingly then, means for preventing springback are provided immediately adjacent both sides of the radial seal.

The reduced diameter segment 28 of wall portion 24 is formed after seal member 36 and cover member 38 are inserted into container 20 but before lip 74 is completely formed. More specifically, after insertion of all cell components into container 20, wall portion 24 is deformed radially inwardly in the region of sealing surface 32. The deformation applied reduces the diameter of segment 28 below the diameter of segment 26 by an amount sufficient to cause the outwardly facing sealing surface 58 on seal member 36 to sealingly engage the sealing surface 32 on wall portion 24 and to further cause the inwardly facing sealing surface 60 on seal member 36 to sealingly engage the edge face 72 on cover assembly 38. With the deformation so applied the seal member 36 is in a state of radial compression between sealing surfaces 58 and 60 whereat a primary seal against the leakage of electrolyte is effected.

Prior to removing the radial force deforming wall portion 24, lip 74 is formed in end 23 of container 20 contemporaneously with the aforementioned radially deforming force by bending the end of wall portion 24 radially inwardly and then axially toward cover assembly 38. Since lip 74 is formed before the release of the radial deforming force effecting the primary seal, the deformation of lip 74 permanently sets the deformation induced by the radially deforming force. When the radially deforming force is released, the lip 74 prevents springback of the reduced diameter segment 28 of wall portion 24.

An important feature of the present invention relates to the seal member 36. As earlier stated materials used in prior art seals comprised of crystalline polymers such as nylon have not proved to be entirely satisfactory because of limitations in deformeability and compressive strength. These limitations are attributed to the fact that crystalline polymers by their very nature have an ordered arrangement and regular recurrance of molecular structures. Under high deformation and compressive stress the rigidity attendant the ordered arrangement results in an early and rather abrupt fracture of the crystalline structure. Accordingly then, by their very nature crystalline polymers are not entirely suitable for seal applications having high deformation and high compressive stresses.

The seal member 36 of the present invention is comprised of polysulfone which is an amorphous polymer. By its very nature an amorphous polymer has no definite order of crystallinity. It is believed that the amorphous nature of polysulfone whereby there is no ordered arrangement of molecules results in physical properties whereby the material can undergo substantial deformation of up to 50% without suffering a significant degradation in sealing capability. Similarly, the material can be subjected to substantial compressive stress without any substantial degradation in sealing capability.

Polysulfone offers other advantages over crystalline polymers such as nylon previously used as materials in prior art seals. First, the material has a high creep resistance under sustained load for a long period of time. Second, the material is resistant to water and steam, elements generated during the cycle of an electrochemical cell, and accordingly, do not hydrolyze or break down over a period of time. Thirdly, the material is highly resistant to the corrosiveness of the electrolyte used in nickel-cadmium electrochemical cells. These are but some of the advantages.

Seals made of polysulfone may be subjected to radial compression of at least 50% of the free radial thickness of the material and to compressive loads from about 9,000 psi up to about 40,000 psi. The preferred range of radial compression for application of a polysulfone seal for an electrochemical cell is believed to be from about 20% to about 50% of the free radial thickness while the preferred range of compressive stress is believed to be from about 14,000 psi to about 40,000 psi.

Figure 3:
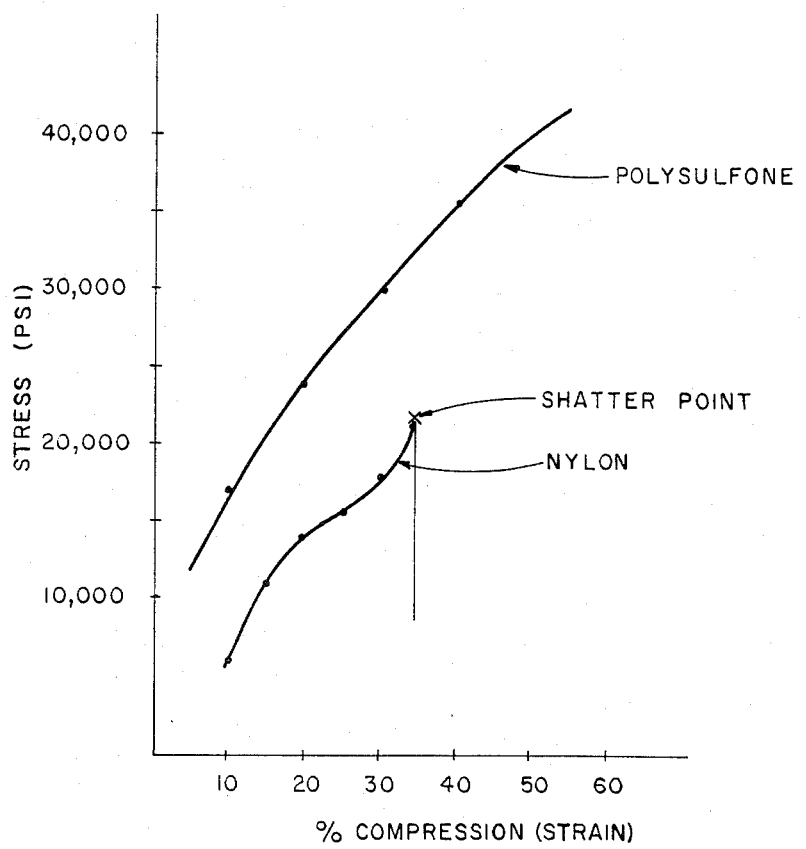
FIG. 3 depicts a chart exhibiting the relationship between stress and strain for certain seal materials.

Referring to FIG. 3, a chart depicting compressive stress as a function of percent of compression is presented for both the crystalline polymer nylon and the amorphous polymer polysulfone. It is observed that starting at about 20% the stress/strain relationship for the compression of nylon exhibits a marked change. At about 20% compression the material enters a region where the stress in the material increases at an increasing rate for equal incremental increases of strain. It is believed that this occurrance is caused by the breakdown of the crystalline structure of the nylon. By about 33% the breakdown is so complete that further compression of the material is unattainable and the material shatters. On the other hand, polysulfone maintains a favorable stress/strain relationship up to at least 50% deformation. It is clear that polysulfone can withstand higher stresses over a greater range of deformation and accordingly is more suitable for seal applications in electrochemical cells than are crystalline polymers such as nylon.

Referring now to FIGS. 4 and 5, the method of making the electrochemical cell of the present invention will be further described to enhance an understanding of the invention. The container 20 of substantially uniform diameter, into which the electrode assembly 34 has been inserted as previously desribed, is placed into a cylindrical recess in a supporting nest 78 which supports one end of the container 20 during formation of rib 44 in wall portion 24. Supporting container 20 at its other end, a plug-type support 80 includes a cylindrical projection 82 extending into container 20 to provide support to wall portion 24 at end 23 in order to preclude deformation during formation of rib 44. Rib 44 is formed by rotating wheel 83 which is advanced toward container 20 such that its groove profile edge 84 conformingly deforms wall portion 24 radially inwardly to form rib 44. Nest 78 and support also rotate to facilitate formation of rib 44. Thereafter the container 20 is removed from nest 78.

After forming rib 44, the wall surface 32 on container 20 is coated with a thin film of liquid bituminous compound which rapidly dries to form a tacky surface on wall surface 32 which fills in the surface pores on wall surface 32 thereby enhancing sealing integrity. Thereafter, the seal member 36 and cover assembly 38 are inserted into the container 20 and the wall portion 24 at end 23 of container 20 may be subjected to a pre-curl operation whereby the wall portion 24 is initially and slightly deformed radially inwardly in preparation for the later formation of lip 74. The container is then placed into lower half 86 of a swaging die so as to partially protrude therefrom. The upper half 88 of the swaging die is comprised of an outer swaging member 90 having an internal bore 92 and an inner plunger member 94 residing in bore 92. In a manner hereinafter to be described swaging member 90 is employed to provide end 23 of container 20 with reduced diameter segment 28 and the inner plunger member 94 is employed to provide lip 74.

Bore 92 of outer swaging member 90 is defined by a first cylindrical surface 96 having a diameter very slightly larger than the diameter of the first enlarged diameter segment 26 of container 20. During the swaging operation surface 96 provides radial support to segment 26. Bore 92 is further defined by a second cylindrical surface 98 having a diameter substantially equal to reduced diameter segment 28 of container 20. Lead-in chamfer surface 100 further defines bore 92 intermediate surfaces 96 and 98. During the swaging operation, surface 98 reduces the diameter of container 20 at end 23 to provide reduced diameter segment 28 and thereby effect a radial compressive force on seal member 36. Inner plunger member 94 is provided with an end profile 102 having the configuration of the final profile of lip 74.

Referring now to FIGS. 5 and 6, in order to effect a radial sealing function in electrochemical cell 10, outer swaging member 90 of upper die 88 is moved toward lower swaging die 86 until engagement is effected between member 90 and die 86. In this position, surface 98 has forced the end 23 of container 20 to deform radially inwardly to form reduced diameter segment 28. Having thus established a radial sealing function, the inner plunger member 94 is then moved toward die 86 sufficiently to cause profile 102 to engage end 23 of container wall 24 and deform the end 23 radially inwardly and axially toward cover assembly 38 to form lip 74. Formation of lip 74 is accomplished while surface 96 is in engagement with container 20 to insure that lip 74 will prevent springback of wall portion 24 when swaging member 90 is drawn away from lower half 86. FIG. 6 depicts swaging member 90 and inner plunger member 94 at the bottom of their strokes whereby swaging member 98 is in abutting engagement with lower swaging die 86 and plunger member 94 is in engagement with lip 74.

It is observed that the invention set forth above and hereinafter claimed is well adapted to achieve the objects hereinbefore stated. More specifically, an electrochemical cell is provided wherein a seal member comprised of an amorphous polymer cooperates with a cell container strengthened by a rib on one side of the sealing surface and a container lip on the other side of the sealing surface. This combination enables a high radial compressive force to be established at the seal/container interface and further enables the high radial compressive force to be maintained over the life of the cell.

While the preferred embodiment of the present invention has been depicted and described, it should be appreciated that modifications and alterations may be made in the embodiment without departing from the scope of this invention as set forth in the appended claims.

I claim:

1. A method for sealing a rechargeable electrochemical cell having a hollow cylindrical container having a first and second end and comprised of a cylindrical axially and circumferentially extending wall portion having a radially inwardly facing sealing surface disposed thereon, said container further having a bottom portion formed integrally with said wall portion, said bottom portion closing said first end of said cylindrical container, said cell further having a spirally wound electrode assembly disposed within said container, said assembly comprised of a pair of electrode plates of opposite polartiy separated from each other by an electrolyte absorbant separator, said cell further having a cover assembly disposed in said container proximate said second end opposite said bottom portion, said method comprising the steps of:

providing said cylindrical container;

inserting said spirally wound electrode assembly into said cell container axially adjacent said bottom portion;

deforming said wall portion to form a stiffening rib in said wall portion, said rib extending radially toward and circumferentially about said axis and disposed axially adjacent said electrode assembly so that said electrode assembly is disposed in said container between said rib and said bottom portion;

inserting an annular seal member into said container axially immediate adjacent to said rib, said seal member comprised of an amorphous polymer and having a first circumferentially extending radially outwardly facing sealing surface disposed radially adjacent to and radially inwardly of said sealing surface on said wall portion, said seal member having a second circumferentially extending radially inwardly facing sealing surface coaxial with said first sealing surface on said seal member;

inserting said cell cover assembly into said container, said cover assembly having a circumferentially extending radially outwardly facing edge face, said cover assembly inserting step including the step of disposing said cover assembly into said container such that said edge face is disposed radially inwardly of and radially adjacent to said second sealing surface on said annular seal member;

applying a radially inwardly directed force to said wall portion adjacent said radially inwardly facing sealing surface on said wall portion so as to permanently reduce the diameter of said wall portion adjacent said sealing surface on said wall portion and radially compress said annular seal member between said radially inwardly facing sealing surface on said wall and said radially outwardly facing edge face on said cover member; and reducing the radially outward spring back of said wall portion by deforming said container wall portion at said second end of said container toward said cover assembly to provide a lip projecting radially inwardly, said springback reducing step occuring contemporaneously with said force applying step.

2. The invention as set forth in claim 1 wherein the amorphous polymer is comprised of polysulfone.

3. The invention as set forth in claim 1 wherein said force applying step includes the step of applying a force of sufficient magnitude to establish a radial compression in said annular seal member in an amount greater than about 9,000 psi.

4. The invention as set forth in claim 1 wherein said force applying step effects a primary seal at a said first and second sealing surfaces on said seal member and said spring back reducing step effects a secondary seal between said lip and said seal member.

* * * * *